One

United States Patent [19]

Eggers

[11] 4,071,587

[45] Jan. 31, 1978

[54] METHOD OF MAKING ZRH FUEL ELEMENT

[75] Inventor: George H. Eggers, San Diego, Calif.

[73] Assignee: General Atomic Company, San Diego, Calif.

[21] Appl. No.: 616,584

[22] Filed: Sept. 25, 1975

[51] Int. Cl.$^2$ .............................................. G21C 21/00
[52] U.S. Cl. ................................ 264/.5; 252/301.1 R
[58] Field of Search .................... 264/.5; 252/301.1 R, 252/301.1 S; 176/82

[56] References Cited

U.S. PATENT DOCUMENTS

| 3,514,412 | 5/1970 | Triggiani | 264/.5 |
| 3,668,283 | 6/1972 | Moreau | 264/.5 |
| 3,715,204 | 2/1973 | DeGrazio et al. | 264/.5 X |
| 3,943,210 | 3/1976 | Vetrano | 264/.5 |

*Primary Examiner*—Peter A. Nelson
*Attorney, Agent, or Firm*—Fitch, Even, Tabin & Luedeka

[57] ABSTRACT

A method of making a nuclear fuel element for a fission reactor. A solid body of an alloy of zirconium and nuclear fuel metal is exposed to hydrogen at an elevated temperature to hydride the zirconium. The hydrided alloy is exposed to oxygen at a lower temperature to form a continuous oxide layer about its exterior surface and is employed in a gastight container as a fuel element. The hydrided alloy may be exposed to oxygen at a temperature of at least about 300° C. prior to its enclosure in the container, or the hydrided alloy may be enclosed in the container together with a quantity of an oxygen-providing material, such as $CO_2$ or $H_2O$, sufficient to oxidize its exterior surface when the fuel element is raised to an elevated temperature.

10 Claims, No Drawings

METHOD OF MAKING ZRH FUEL ELEMENT

This invention relates generally to nuclear fuel elements and more particularly to methods for making nuclear fuel elements utilizing an alloy of nuclear fuel metal and zirconium hydride.

Fuel elements utilizing a substantially homogeneous mixture of fissionable uranium metal and zirconium hydride are employed in the TRIGA reactor marketed in the United States and worldwide by General Atomic Company. This nuclear fission reactor, which has proved useful for many research purposes, is more fully described in U.S. Letters Pat. Nos. 3,120,471 and 3,127,325. Fuel elements for the TRIGA reactor have long been made by first metallurgically forming an alloy of zirconium and uranium metal and then hydriding the alloy by exposing it to a substantially pure hydrogen atmosphere at elevated temperatures, for example, between about 700° C. and about 900° C. Usually, a temperature of at least about 765° C. is employed, and hydrogen is supplied at about atmospheric pressure. Examples of suitable hydriding methods are set forth in U.S. Letters Pat. Nos. 3,070,526, 3,135,697 and 3,154,845.

Standard fuel elements for the TRIGA reactor generally comprise several cylindrical blocks of the hydrided fuel disposed within a metal, gastight container, which container may also include blocks of graphite moderator adjacent the upper and lower ends of the enclosure. The TRIGA neutronic reactors are designed to operate with a liquid coolant, for example, water, and have heretofore been operated at fuel element temperatures between about 300° C. and about 500° C. except for pulsing operation where momentary higher temperatures were reached. Sustained operation at higher temperatures has not heretofore been considered feasible because the hydriding of the zirconium is a reversible chemical reaction, and at higher temperatures, for example, above the one atmosphere equilibrium temperature, i.e., about 765° C., dissociation begins to occur, releasing hydrogen in substantial amounts and resulting in changes in the crystalline structure of the alloy that are considered detrimental. Moreover, it has heretofore been considered that sustained operating temperatures should not exceed about 500° C. because there should be some leeway in the case of emergency situations so that any unexpected rise in temperature can be arrested before such a large amount of dissociation takes place that a dangerous condition might result in a sudden buildup of high hydrogen pressure within the gastight fuel element containers threatening to cause rupture of the metal container.

It is an object of the present invention to provide an improved nuclear fuel element utilizing the homogeneous dispersion of nuclear fuel metal and zirconium hydride and a method for making same. Another object of the invention is to provide a zirconium-hydride-moderated nuclear fuel element which is suitable for sustained operation at temperatures above 800° C. A further object of the invention is to provide an improved method for making nuclear fuel elements containing zirconium hydride within a gastight container without substantial additional expense which have superior high temperature operating characteristics. These and other objects of the invention will be apparent from a reading of the following detailed description of methods for making nuclear fuel elements embodying various features of the invention.

It has been found that a nuclear fuel body made of an alloy of zirconium hydride and nuclear fuel metal can be treated so as to form a continuous film about the entire exterior of the body, which film thereafter acts as a barrier that effectively prevents dissociation of hydrogen from the zirconium hydride which forms the major portion of the alloy. A continuous film is created by exposing the hydrided fuel alloy to oxidizing conditions at elevated temperatures which causes the outermost regions of the fuel body to be converted from zirconium hydride to zirconium oxide. Zirconium readily oxidizes when exposed at appropriate temperatures to oxygen or to other compounds that have appreciable dissociation pressures of oxygen, and the resultant crystalline zirconium oxide which is formed creates an effective envelope about the fuel body which resists subsequent outward permeation of hydrogen.

As described in more detail in the aforementioned U.S. patents, solid nuclear fuel bodies containing a substantially homogeneous dispersion of zirconium hydride and nuclear fuel metal are generally prepared by first forming a suitable metal alloy, machining it to the desired shape and size and then hydriding it. The term "nuclear fuel metal" should be understood to mean any of the actinide series of elements that is capable of readily fissioning or which can be converted into a fissionable material as a result of irradiation in a nuclear reactor, for example, uranium, plutonium and thorium. The TRIGA reactors, which are presently in use throughout the world, utilize uranium metal as the nuclear fuel, and accordingly uranium is hereinafter used throughout as the nuclear fuel example for convenience purposes.

An alloy is prepared by melting zirconium and a suitable weight percent of uranium, as desired by the neutronic characteristics of the reactor wherein the fuel element will be used. Generally, an amount of nuclear fuel metal up to about 20 weight percent may be employed, depending upon the alloying characteristics of zirconium with the particular nuclear fuel metal; of course, the desired neutronic character of the intended nuclear reactor core dictates the amount to be used. When uranium is used, it is generally employed in an amount between about 5 weight percent and about 15 weight percent, based upon total weight of uranium plus zirconium. Commercial TRIGA fuel elements use fuel bodies containing between about 8 and about 12 percent uranium.

Some expensive growth of the metal alloy body occurs during hydriding, and this is taken into consideration during the initial machining of the metal alloy. As taught by the aforementioned patents, hydriding to a hydrogen-to-zirconium atom ratio of about 1:1 can be accomplished in one or two days, using temperatures of about 800° C. Still higher hydrogen-to-zirconium atom ratios can be obtained; for example, a ratio of about 1.7:1 can be obtained using a slower hydriding at about 760° C. over a period of about three days. By altering pressure and temperature conditions, ratios of about 1.85:1, and even as high as 2:1, can be obtained; however, it has been found that cracking may become a problem when a ratio of 2:1 is approached. Generally, hydriding to a ratio above about 1.8:1 is not employed, and a ratio of between about 1.5:1 and about 1.7:1 is used for the fuel bodies for the TRIGA fuel elements.

The chemical conditions for hydriding are described in detail in the aforementioned patents. As an example, the machined alloy metal slug is placed in a vacuum furnace which is flushed with a suitable gas, such as hydrogen, and is then evacuated to a pressure of about 1–10 microns. The slug is then slowly heated under such vacuum conditions until the desired hydriding temperature is reached. At this time, purified hydrogen is slowly bled into the furnace causing the exothermic hydriding reaction to begin to occur. The pressure of hydrogen is generally maintained at a level of at least about 100 millimeters of mercury above the dissociation pressure of the zirconium hydride at the temperature which is being employed. After hydriding is completed, the hydrided fuel slug is allowed to very slowly cool so as to avoid cracking that might occur during rapid contraction.

If it is desired to carry out the oxidation reaction during this cool-down, when a temperature of about 400° C. is reached, oxygen gas is bled into the furnace so that it displaces the hydrogen, and an oxygen atmosphere is maintained for about 15 minutes at which time the oxygen supply is discontinued. The cool-down then continues for about 4 hours. Zirconium is readily oxidizable, and the oxidation reaction proceeds fairly readily at 400° C. As a result of such oxidation, a thin continuous film of zirconium oxide, which is primarily zirconium dioxide but may include minor amounts of oxides of other materials which are present within the crystalline structure, for example, erbium oxide, and minor amounts of uranium oxides. Under the foregoing conditions, the oxide layer which is formed is at least about 10 mils thick about the entire surface, and it has a continuity such that it constitutes an effective envelope about the entire fuel body. The presence of the oxide layer is readily ascertainable by its black color, as opposed to the otherwise grayish-white appearance of zirconium hydride. In general, the thickness of the oxide layer need only be sufficient to assure continuity throughout the fuel body envelope, and it is considered that a layer which averages about 5 mils thick is sufficient to give such assurance. However, during extended operation, the oxide may begin to migrate slowly inward into the fuel slug, and therefore a thickness of about 10 mils is preferred.

As earlier indicated, there is some growth which occurs during the hydriding operation, and the growth is not necessarily uniform about the entire fuel body. Therefore, to meet the close tolerances considered necessary for nuclear fuel operations, a subsequent grinding operation is generally effected to assure that the precise exterior dimensions are achieved. The nonuniform growth which may occur is relatively minimal, and the grinding operation does not destroy the integrity of the continuous oxide envelope that has been created. However, to be positively assured that there is no such difficulty, the oxidation step can be omitted during the cool-down from the hydriding temperature and effected after the finished machining has been carried out, as by thereafter heating the hydrided fuel body to the desired temperature, i.e., usually between about 300° C. to 400° C., in an oxygen atmosphere to effect desired oxidation to the appropriate depth.

Alternatively, the oxidizing step can be postponed until after the assembly of the fuel element, and use may be made of the normal temperatures to which the fuel element will be subjected in the core of the nuclear reactor, effecting oxidation by providing an oxygen source in the fuel element container. The fuel element container, which provides the enclosure wherein one or more of these fuel bodies is disposed, is formed of a suitable high-temperature-stable, noncorrosive metal, such as stainless steel, Hastelloy or other similar high nickel alloys well known in the nuclear reactor art today. The fuel element container usually includes an elongated sleeve of circular cross section having a wall thickness of about 20 mils and having an inner diameter matched to the desired tolerance with the outer diameter of the hydrided fuel bodies. There is generally some space provided within the container to accommodate axial expansion, and such space is more than adequate to accommodate a suitable source of oxygen.

Usually, the fuel element assembly is completed by welding one end cap to the remainder of the fuel-filled fuel element container, and accordingly an oxygen-provider is utilized which does not adversely affect such welding operation. The preferred sources of oxygen are water and carbon dioxide, both of which will dissociate to give an appreciable partial pressure of oxygen that will effect the desired oxidation of the zirconium hydride surface as the reactor is brought up to its operating temperature, namely between about 300° and 800° C. These preferred compounds leave residual products, namely hydrogen and carbon which are fully acceptable from a nuclear standpoint within the reactor core. Water is easily provided in liquid form, and carbon dioxide may be provided in solid form. However, carbon dioxide is also compatible with welding operations, and welding could be effected under several atmospheres of carbon dioxide pressure in order to provide a sufficient amount of carbon dioxide within the confines of the fuel element container to subsequently effect the desired oxidation.

The hydrogen dissociation pressure of such an oxidized uranium-zirconium hydride fuel body is found to be only about 4 atmospheres at 1100° C., and this is contrasted with the theoretical dissociation pressure for zirconium hydride (having a hydrogen-to-zirconium ratio of about 1.56:1) which is about 40 atmospheres. As a result, the barrier against dissociation which is provided by the continuous oxide envelope is considered to allow the present research reactors to be operated at higher temperatures, because any momentary temperature excursions which might occur will no longer result in the creation of sudden, potentially dangerous hydrogen pressure buildups within the fuel elements. Moreover, the fact that such higher operating temperatures are now feasible renders the fuel system potentially more attractive for use in a power reactor, wherein a higher operating temperature means a higher steam temperature is available resulting in potentially more efficient generation of electricity.

The following Examples illustrate several methods for making nuclear fuel bodies embodying features of the invention; however, it should be understood that these Examples are only illustrative and in no way constitute limitations upon the invention.

EXAMPLE I

A zirconium-uranium alloy slug in the form of a cylindrical rod about 5 inches (12.7cm) long, 1.4 inches (3.6cm) in diameter and having a 0.25 inch (0.64cm) diameter hold extending longitudinally through the center thereof is prepared and cleaned using trichloroethylene or acetone.

The cleaned slug is then placed within an induction or resistance-heated vacuum furnace upon a suitable support so as to expose substantially all of the exterior surface thereof to the atmosphere of the furnace. Flushing with hydrogen is carried out, and then the furnace is evacuated while cold to a pressure of about 10 microns. The temperature is then slowly raised to about 765° C. over a period of about 20 hours. When this temperature is reached, hydrogen is slowly allowed to enter the furnace and allowed to build up to an initial equilibrium pressure of about 100 Torr. Several equilibrium pressure steps are used until finally the pressure is increased to about 1 atmosphere. The total hydriding time lasts for about three days. Slow cooling is then carried out so that room temperature is reached after about another day's time. Testing of the resultant product shows that hydriding has been effected and that the hydrided fuel body has a hydrogen-to-zirconium ratio of about 1.6:1.

The hydrided fuel body is then returned to the furnace, and oxygen is supplied and maintained at one atm. pressure. The body is heated to a temperature of about 400° C. over a period of about 15 minutes and then allowed to cool down for about one-half the amount of time. Treatment in this manner produces an outer layer that is substantially zirconium dioxide having an average thickness of about 5 mils.

Three fuel bodies made in this manner are loaded into the fuel chamber of a fuel element container made of type 304 Stainless Steel, having a wall thickness of about 0.020 inch (0.5mm) and an internal diameter of about 1.44 inches (3.66cm). The length of the fuel element container without end caps is about 23.0 inches (0.584m), and it accommodates the three fuel slugs, plus upper and lower short moderator cylinders, each about three inches (7.6cm) in length and made of nuclear grade graphite. A zirconium metal rod having a diameter of about 0.25 inch (0.63cm) and a length of about 15 inches (38 cm) is inserted into the aligned central holes in the three fuel bodies. An end cap is then welded onto the upper end of the fuel element body to provide a gastight enclosure. Testing shows the fuel element is suitable for use in a nuclear reactor operating at a temperature of above 800° C.

EXAMPLE II

The method of Example I is repeated except that, on the cool-down-cycle for the hydriding, oxygen is admitted to the furnace when the temperature reaches about 400° C., and one atmosphere of oxygen pressure is maintained within the furnace until the cool-down is completed. Thereafter, finish machining is carried out so as to grind away any regions of nonuniform growth, and examination shows that the fuel body is coated with continuous zirconium oxide coating. The subsequent oxidation step of Example I is omitted. Three such fuel bodies are installed within a similar fuel element container and the end is sealed with an end cap. Testing shows the fuel element is ready for use in a nuclear reactor operating at a temperature above 800° C.

EXAMPLE III

The method of Example I is repeated except that the oxidation step is again omitted. In assembling the moderator and fuel within the fuel element container, one milliliter of distilled water is deposited in the container, upon the lower moderator cylinder, before the insertion of the fuel bodies. The end cap is welded in place in the usual manner to simulate initial heat-up in the core of a nuclear reactor. Testing shows the fuel element is ready for use in a nuclear reactor operating at a temperature above 800° C. After cool-down, the fuel element is disassembled and examination shows that a continuous zirconium oxide coating greater than 5 mils thick surrounds the fuel bodies.

Although the invention has been described in respect of certain preferred embodiments, it should be understood that modifications as would be obvious to one having the ordinary skill of the art should be understood as falling within the scope of the invention. For example, oxygen or some other oxygen-containing gas could be injected into the fuel element after welding was completed, instead of employing carbon dioxide. Various features of the invention are set forth in the claims which follow.

What is claimed is:

1. A method of making a nuclear fuel element for a nuclear fission reactor, which method comprises
   providing a solid body of an alloy of zirconium and nuclear fuel metal containing nuclear fuel metal in an amount of between about 5 and about 20 weight percent,
   exposing said body to hydrogen at an elevated temperature to transform said zirconium to zirconium hydride having a hydrogen-to-zirconium ratio of at least about 1.5 to 1,
   exposing said hydrided alloy to oxygen at a temperature below said elevated temperature to form a continuous oxide layer about the exterior surface of said body and
   enclosing said hydrided alloy in a gastight container to form a nuclear fuel element.

2. A method in accordance with claim 1 wherein said alloy contains uranium in an amount between about 5 and about 15 weight percent, based upon weight of zirconium plus uranium.

3. A method in accordance with claim 2 wherein said continuous oxide layer is at least about 5 mils thick.

4. A method in accordance with claim 1 wherein said hydrided alloy is enclosed in said gastight container together with a quantity of an oxygen-providing material sufficient to oxidize the exterior surface of said alloy and wherein said continuous oxide layer at least 5 mils thick is formed within said gastight container when the temperature of said fuel element is raised.

5. A method in accordance with claim 4 wherein said material is selected from the group consisting of carbon dioxide and water.

6. A method of making a nuclear fuel element for a nuclear fission reactor, which method comprises
   providing a solid body of an alloy of zirconium and nuclear fuel metal,
   exposing said body to hydrogen at an elevated temperature to transform said zirconium to zirconium hydride, exposing said hydrided alloy to oxygen at a lower temperature, below said elevated temperature, to form a continuous oxide layer about the exterior surface of said body, and
   enclosing said hydrided alloy in a gastight container to form a nuclear fuel element.

7. A method in accordance with claim 6 wherein said hydrided alloy is exposed to oxygen at a temperature of at least about 300° C. prior to enclosing said body in said container.

8. A method in accordance with claim 6 wherein said hydrided alloy is enclosed in said gastight container together with a quantity of an oxygen-providing material sufficient to oxidize the exterior surface of said alloy when said fuel element is raised to about 400° C.

9. A method in accordance with claim 8 wherein said material is selected from the group consisting of carbon dixoide and water.

10. A method in accordance with claim 8 wherein said material is water.